United States Patent [19]
Kelley

[11] Patent Number: 5,220,557
[45] Date of Patent: Jun. 15, 1993

[54] MULTIPLE USE DIGITAL TRANSMITTER/TRANSCEIVER WITH TIME MULTIPLEXING

[75] Inventor: Edwin A. Kelley, Los Angeles, Calif.

[73] Assignee: Hughes Aircraft Company, Los Angeles, Calif.

[21] Appl. No.: 765,157

[22] Filed: Sep. 23, 1991

[51] Int. Cl.$^5$ ............................ H04J 4/00; H04J 1/05
[52] U.S. Cl. ........................................ 370/50; 370/70; 375/7; 375/60; 375/61; 455/73; 455/84; 455/103
[58] Field of Search ................. 370/11, 50, 70; 375/7, 375/60, 61; 455/73, 84, 103

[56] References Cited

U.S. PATENT DOCUMENTS

4,206,320  6/1980  Keasler et al. ................. 370/11
4,237,551 12/1980  Narasimha ...................... 370/50

Primary Examiner—Douglas W. Olms
Assistant Examiner—Russell W. Blum
Attorney, Agent, or Firm—Terje Gudmestad; Wanda K. Denson-Low

[57] ABSTRACT

A digital transmitter/transceiver accommodates multiple simultaneous receiver and transmitter channels by time division multiplexing the tuning and modulation hardware. Only a single digital-to-analog converter is required for multiple channel transmission, and time multiplexing permits the use of only a single set of digital hardware.

24 Claims, 5 Drawing Sheets

MULTIPLE USE DIGITAL TRANSMITTER/TRANSCEIVER WITH TIME MULTIPLEXING

BACKGROUND OF THE INVENTION

1. Field of the Invention

This invention relates to digital RF transmitters and transceivers, and more particularly to digital transmitter and transceiver systems capable of simultaneously servicing multiple channels.

2. Description of the Related Art

There are a number of areas in which multiple channel transmission is required, including applications which call for different modulation formats and bandwidths. For example, commercial avionics requires both air-to-air and air-to-ground communication and data links for the transmission of voice and data, a radar altimeter which measures the reflection of a radio signal from the ground to determine the distance from the plane to the earth's surface, and an S-mode transponder transceiver that responds to a ground radar signal and returns a signal with aircraft identification, airspeed, heading, and altitude information for air traffic control operations.

With current technology, each of these communication links requires a separate transmitter. The signals may be generated digitally, but are converted to analog format and amplified for transmission. The analog components, including the analog-to-digital converter (ADC) and digital-to-analog converter (DAC), are the most costly elements; providing these elements separately for each different transmission channel multiplies the overall cost. In addition, providing a separate transmitter for each different channel increases the size, weight and power requirements of the overall communications system.

SUMMARY OF THE INVENTION

The present invention seeks to provide a transmitter/transceiver system that employs digital signal processing, is capable of accommodating numerous different transmission channels with a common set of digital hardware and analog components, and therefore achieves lower cost, size, weight and power requirement than previous multiple channel systems. A system that is compatible with most popular types of modulation is also desired.

To realize these goals, a plurality of different digital information signals are generated and used to modulate respective higher frequency digital carrier signals, with the resulting modulated signals accumulated to a composite digital signal. A common DAC is used to convert the composite digital signal to analog format for transmission. The frequency of the composite signal is shifted to a desired RF band either before or after the digital-to-analog conversion, and a filter is provided to exclude frequencies outside the desired RF band from the composite signal. When signal amplification is needed, a common analog power amplifier is used to amplify the composite analog signal.

In a preferred embodiment both the digital information and the digital carrier signals are separated by time multiplexing, and the resulting time multiplexed modulated signals are accumulated to a simultaneous time basis before the DAC conversion. The shift to an RF level may be accomplished digitally by increasing the signal sampling rate to create higher frequency images of the signal, and selecting a desired one of the images for transmission. This is preferably accomplished with a finite impulse response (FIR) filter and an interpolation filter, with zero values assigned to the added samples. The frequency band of the original baseband digital signal is increased to a level compatible with the carrier signals by a similar mechanism. A common FIR filter and interpolation filter may be used for this purpose, with the filter sampling rate equal to the sample rate of the carrier signals multiplied by the number of different channels to be transmitted.

The transmitter may be incorporated into a transceiver that is similarly capable of handling multiple simultaneous reception and transmission channels without the redundancy in equipment required by previous systems. The received channels are time multiplexed together with the transmission channels, with a common direct digital synthesizer used to produce both digital carrier signals for the transmission channels and digital tuning signals for the reception channels on a time multiplexed basis. The reception channels are separated from the transmission channels after complex multiplication by their respective tuning and carrier signals. The received signals may then be reduced to baseband frequencies by a similar FIR and decimation filter used to shift up the frequency of the original baseband transmission signals.

These and other features and objects of the invention will be apparent to those skilled in the art from the following detailed description, taken together with the accompanying drawings, in which:

DETAILED DESCRIPTION OF THE INVENTION

The present invention implements multiple simultaneous digital transmitters and digital receivers by time division multiplexing the modulation and tuning hardware. When multiple channel transmission and/or reception is required, only a single set of digital hardware can be multiplexed to form virtual transmitter and receiver channels. This allows only a single DAC to be used to translate the transmission signals into the analog domain. Where multiple channel transmission is required, including the use of different modulation formats and bandwidths, only a single transmitter power amplifier is required.

The invention is compatible with most popular modulation types such as amplitude modulation (AM), single side band (SSB) and frequency modulation (FM), and digital modulation such as binary phase shift key (BPSK), quadrature phase shift key (QPSK), offset QPSK, quadrature amplitude modulation (QAM), frequency shift key (FSK) and minimum shift key (MSK). These modulations are preferably applied to digital carrier signals with a high speed complex multiplier in a time division multiplexed manner. Since the bandwidth of the modulation is usually substantially lower than the bandwidth of the carrier, it is feasible for these functions to be generated in a lower speed programmable digital signal processor (DSP).

Figure 1:
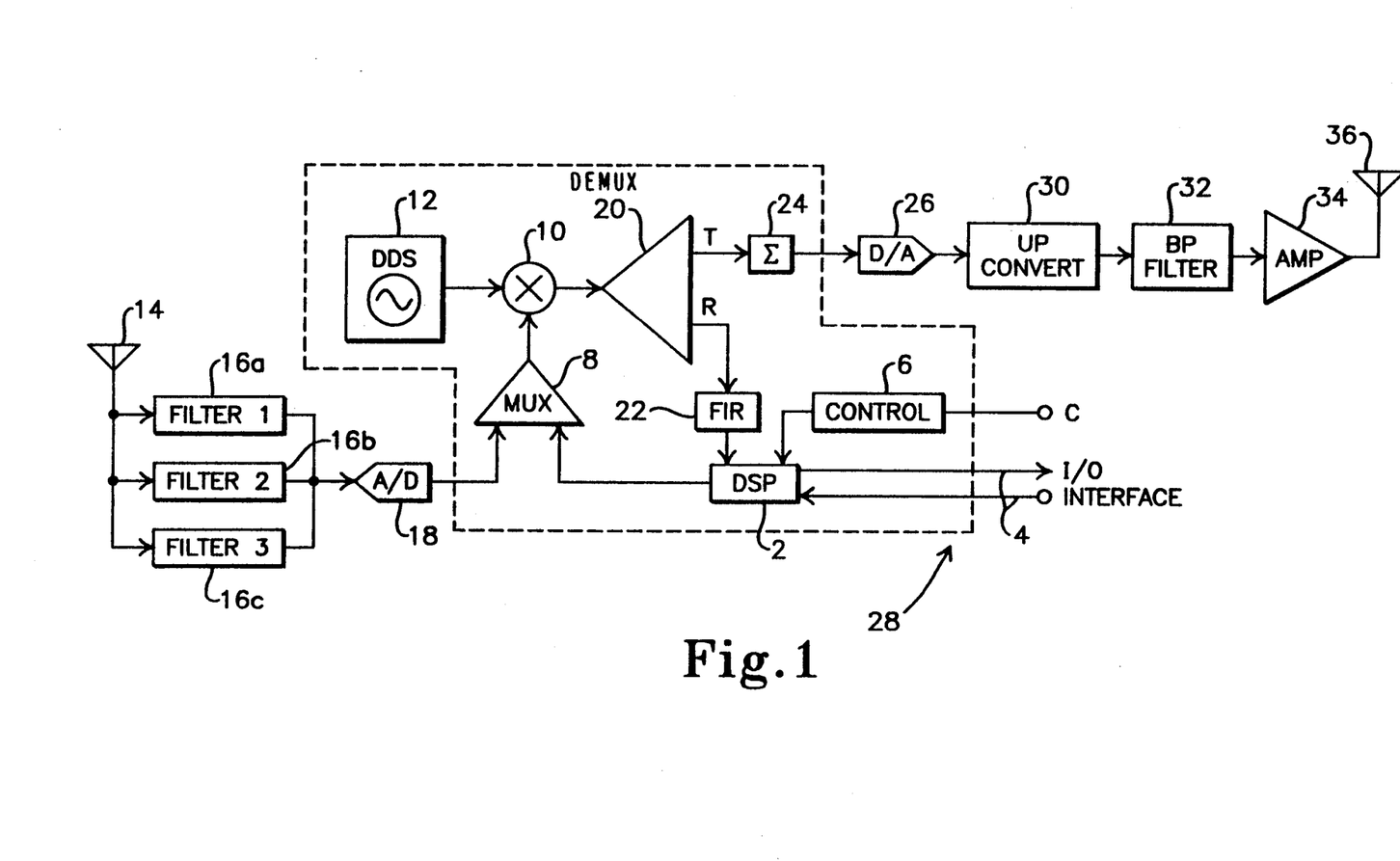
FIG. 1 is a simplified block diagram of a transceiver system that incorporates the invention.

FIG. 1 is a block diagram of a multiple simultaneous channel digital transceiver. In the transmit mode, multiple digital information signals corresponding to the different transmission channels are generated in a relatively low speed programmable DSP 2 such as the Texas Instruments Model TMS320C30 DSP. The DSP includes in/out interface lines 4 that provide for the input and output of transmission and received signals. The DSP is programmed through a control unit 6.

The various baseband transmissions signals from the DSP are delivered as inputs to a time division multiplexer 8, where they are combined by time division multiplexing into a composite signal that is applied to a complex multiplier 10. A direct digital synthesizer 12 generates a plurality of time division multiplexed carrier signals, one for each information signal to be transmitted. The carrier signals are also applied to the complex multiplier 10, where they are modulated by their respective information signals.

In the receive mode an antenna 14, which may be implemented as a separate antenna for each reception channel, receives transmitted signals which may then be amplified (not shown) before being applied to respective anti-alias filters 16a, 16b, and 16c. The characteristics of the filter will depend upon the specific application requirements, and preferably should have very close to linear phase and minimum loss. The filtered signals are directed to an ana-log-to-digital converter (ADC) 18. Although the outputs of filters 16a, 16b and 16c are shown connected together for simplicity, in practice either the input circuitry of ADC 18 would function as a summing node for the filter outputs or a separate summing node could be provided. The ADC's sample rate will depend upon (a) whether baseband or passband sampling is utilized, (b) the signal information bandwidth and/or maximum signal frequency, and (c) aliased image location. Baseband sampling requires a sample rate that is at least twice as high as the highest instantaneous frequency contained in the signal being sampled. Bandpass sampling allows for a sample rate that is less than the frequency of the lower bandedge, so long as the sample rate is at least twice the bandwidth of the single provided by the RF anti-alias filters 16a, 16b, and 16c.

The digital outputs from ADC 18 are applied as inputs to multiplexer 8 along with the transmission signals from DSP 2. The multiplexer combines all of the transmission and reception signals into a composite multiplexed signal that goes to complex multiplier 10. The direct digital synthesizer 12 generates reception tuning signals along with the transmission carrier signals on a time multiplexed basis in synchronism with multiplexer 8, such that each transmission signal operates upon its corresponding carrier signal, and each received signal operates upon its corresponding tuning signal, in the complex multiplier.

The output from the complex multiplier 10 is delivered to a demultiplexer 20 that operates in synchronism with multiplexer 8 to separate the received from the transmission signals. The received signals are directed to a finite impulse response (FIR) filter arrangement 22 that serves as a bandpass filter for each of the multiplexed reception bands. Separate FIR filter coefficients are required for each different service bandwidth; only a single set of FIR filter coefficients are required for multiple channels with a single bandwidth. The number of FIR coefficients per service band will vary according to the original sample rate and the final data rate, but generally will fall within the range of about 20–200. The final demodulation is accomplished in the DSP 2.

The demultiplexed transmission signals are summed together in an accumulator 24, and then transformed to analog format with a standard high speed DAC 26. The DAC 26 brings the signal outside of the digital realm, which is shown enclosed by dashed line 28. The frequency of the analog signal is shifted to a higher level suitable for RF transmission by up converter 30, processed by bandpass filter 32 to remove signals external to the desired transmission channel, and then processed through a standard class-A linear analog power amplifier 34 if further amplification is necessary. Finally, the transmission signals are simultaneously radiated from a suitable antenna 36; a set of different antennas may be employed if a single antenna is not compatible with each of the different transmission channels.

Figure 2:
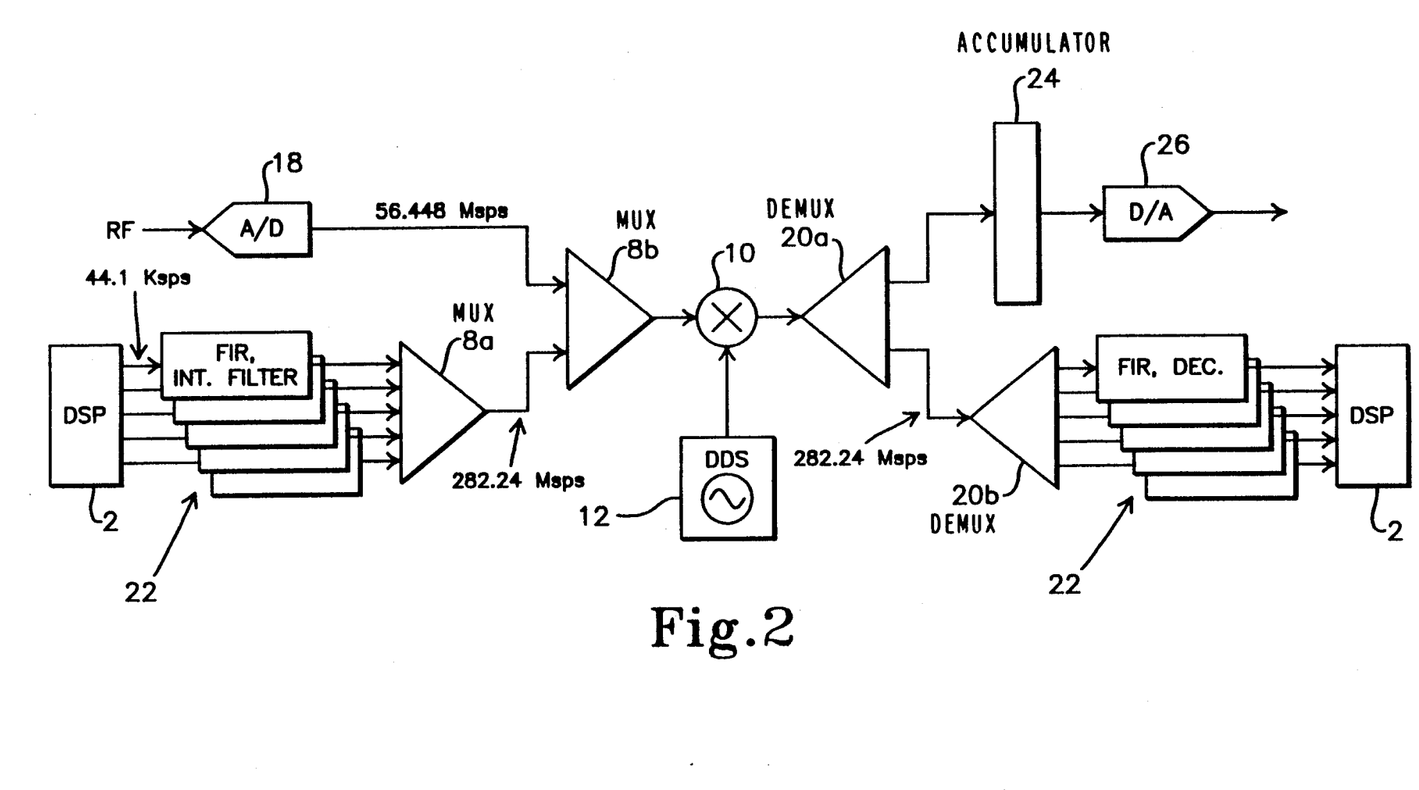
FIG. 2 is a more detailed block diagram showing the digital portions of the system of FIG. 1.

Further details of the digital hardware are shown in FIG. 2. In this diagram the DSP 2 and FIR filter 22 are each shown twice, once on the left hand side of the diagram for their transmission functions and again on the right hand side of the diagram for their receive functions. However, it should be understood that the purpose of this type of presentation is to simplify the diagram, and that only a single DSP and a single FIR filter structure would normally be employed.

If the DSP is assumed to be capable of producing five separate transmission signals, five separate FIR filters 22 are shown. Preferably, however, the FIR filters would be implemented as a single time-multiplexed filter running at a sample rate five times that of a single filter. Assume that the DSP 2 produces up to five transmission signals with a baseband sample rate of 44.1 kilosamples per second (ksps). The FIR filter 22 operates by creating multiple higher frequency images of the baseband signal. For example, 1,279 images in addition to the original baseband signal may be created, with the highest frequency image at 56.448 megasamples per second (Msps) (44.1 ksps×1,280). The FIR filter function 22 includes an interpolation filter that eliminates all of the images except a desired image to be transmitted, generally the highest frequency image. Thus, the FIR and interpolation filters in effect produce an upward frequency shift from baseband. The signal sample rate of the output of FIR filter 22 is 282.24 Msps (56.448 Msps ×5). In the receive path the FIR filter 22 eliminates adjacent channels and channel interference which would fold into the passband during decimation. Thus the FIR and decimation filters in effect produce channel isolation.

The multiplexer 8 of FIG. 1 is shown divided into separate multiplexer sections 8a and 8b in FIG. 2. Multiplexer 8a time multiplexes the transmission signals from FIR filter 22, while multiplexer 8b time multiplexes the signal from multiplexer 8a with the received RF signals from ADC 18. The result is a multiplexed signal that includes tune division of both the transmission and the received signals.

The demultiplexer 20 of FIG. 1 is similarly implemented as a pair of demultiplexers 20a, 20b in FIG. 2. Demultiplexer 20a separates the transmission signals from the received signals, with the transmission signals going to accumulator 24 and the receive signals to the second demultiplexer 20b, at an exemplary frequency of 282.24 Msps. The second demultiplexer 20b separates the different receive channels.

The available multiplexer channels can be divided between transmission and reception modes as desired. For the illustrated example which provides for a total of five channels, any desired number may be assigned to transmission, with the remaining channels available for reception. For example, if three transmission and two reception channels are desired, two of the five possible transmission outputs from DSP 2 would simply be set to zero, leaving these channels available for reception. In the same way, the synthesizer, multiplier and filters could be multiplied to form any desired combination of transmission and reception channels. The modulated transmission waveforms are added together in the digital domain prior to the DAC 26, and then the composite waveform is converted to analog, filtered, up converted and fed to the single power amplifier. Multiple transmission channels are thus possible with only one DAC and one power amplifier. The power output is split between the multiple channels. The division of channels between transmit and receive is set by the DSP, which normally must be reprogrammed to alter this division. Further details of a preferred receiver are provided in copending patent application Ser. No. 714,492 filed Jun. 13, 1991 by the present inventor and assigned to Hughes Aircraft Company, the assignee of the present invention.

Figure 3:
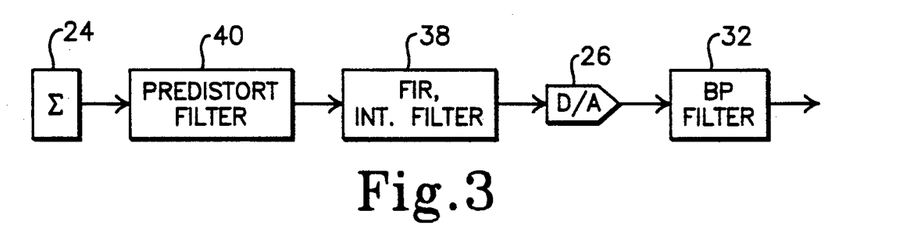
FIG. 3 is a block diagram showing an alternate RF frequency shift mechanism from that depicted in FIG. 1, with the frequency shift implemented digitally.

In the embodiment of FIG. 1, the final frequency shift to RF is accomplished by analog up converter 30. An alternate embodiment, in which the final frequency shift to RF is accomplished in the digital domain, is illustrated in FIG. 3. In this configuration the upconversion function is accomplished by an FIR filter 38 that functions in a manner similar to the FIR filter 22. It produces higher frequency images of the composite signal from accumulator 24. An interpolation filter may also be included to select only one of the higher frequency images for transmission, or this function may be performed by the bandpass filter 32. The bandpass filter would remove all remaining images, as well as the principal spurious frequencies from the DAC 26. The DAC would generally have sufficient output drive to the antenna so that no additional power amplifier would be necessary. A predistortion filter 40 is preferably added to the circuit to compensate for the sinx/x distortion inherent in the FIR filter 38.

Figure 4:
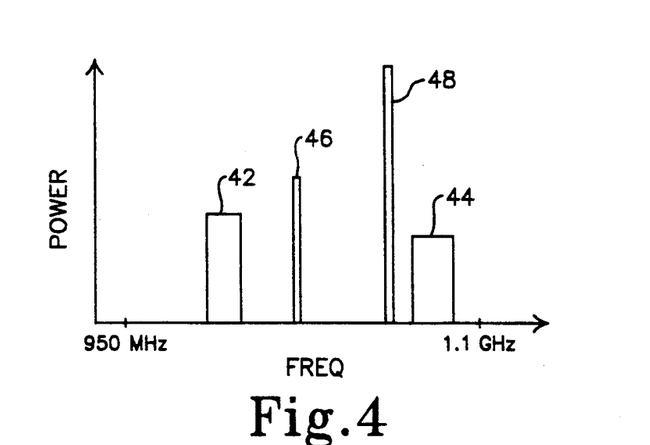
FIGS. 4 and 5 are spectral signal diagrams respectively showing a typical baseband set of signals that are to be transmitted, and higher frequency images of the baseband signals used as a frequency shift mechanism.
Figure 5:
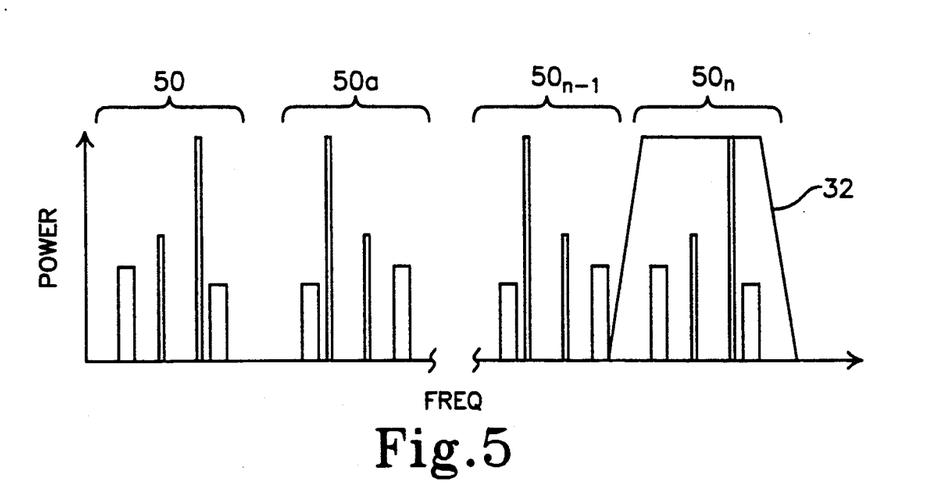

FIGS. 4 and 5 are signal diagrams that illustrate the upconversion process performed by the FIR filters. Assume that the composite signal from accumulator 24 is in a band of about 950 MHz–1.1 Ghz, and includes an air-to-air communications channel 42, an air-to-ground channel 44, an S-mode channel 46 and a radar altimeter channel 48. It should be noted that each of these channels requires a different transmission power, which is accommodated by the present system. As shown in FIG. 5, the original signal band 50 has been replicated by higher frequency images $50a$ ...$50_{n-1}$, $50_n$. The higher frequency images are at integer multiples of the original sample rate. The final bandpass filter 32 is constructed around the transmission band at which the multiple simultaneous transmission signals are desired. This filter rejects the baseband signals and all of the aliased images, so that only the desired aliased image spectra remain.

Figures 6, 7, 8:
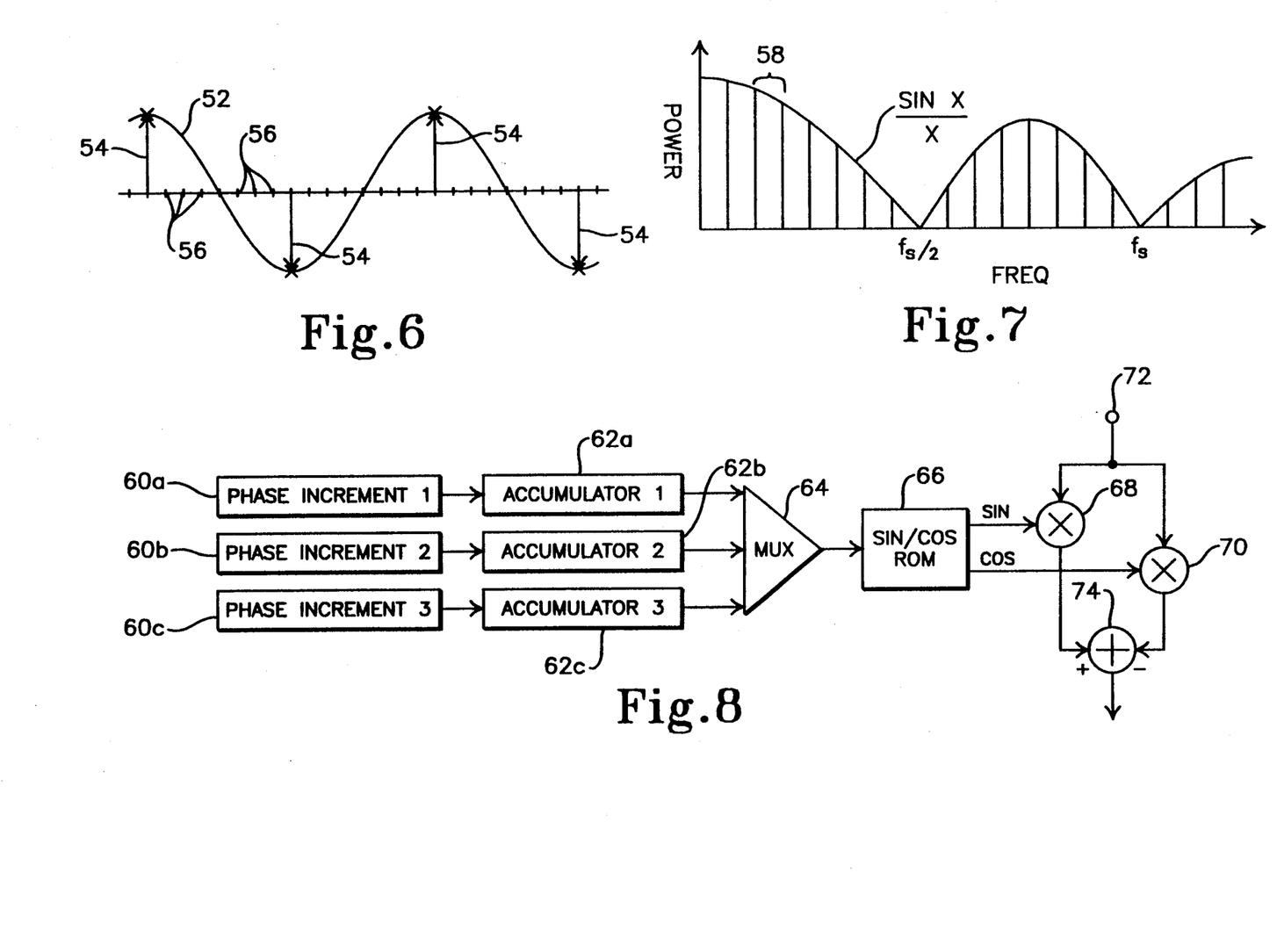
FIG. 6 is a signal diagram illustrating an increase in signal sampling rate used to produce a frequency shift.
FIG. 7 is a signal diagram illustrating the FIR filter output characteristic.
FIGS. 8 and 9 are block diagrams of a direct digital synthesizer and a digital filter used respectively to generate multiple digital carrier signals and to modulate the carrier signals with the digital information signal.

FIG. 6 illustrates the process by which the aliased images are created. The input signal 52 has a frequency $f_s$, represented by digital samples 54 taken every half-cycle. However, additional frequencies which are integer multiples of $f_s$ will share the same sample values. The sampling rate is increased by inserting additional samples 56 between the sample points; zero values are assigned to the added samples by the interpolation filter. The result is an output signal whose sample rate (frequency) is greater than that of the input signal by a factor N, where N is equal to the proportionate increase in the number of samples. For example, to shift a 56 Msps signal to a broadcast RF frequency of 448 MHz, 7 additional samples are added between each pair of original samples, yielding N=8.

FIG. 7 illustrates the sinx/x output characteristic inherent in an FIR filter. This can be accounted for in two ways. First, a predistortion filter 40 (FIG. 3) with an inverse x/sinx transfer characteristic can be added to the digital circuitry. Second, an aliased image, such as image 58, that is relatively close to the baseband and thus has a power level comparable to that of the baseband, may be selected.

Further details of the multiple simultaneous direct digital synthesizer 12 are shown in FIG. 8. Respective phase incrementors 60a, 60b, 60c are provided for each selected reception or transmission channel. Only three channels are illustrated, divided between transmit and receive as commanded by the DSP. The phase incrementors 60a-60c generate real and quadrature components of incremental phase values, at a frequency determined by the selected channel frequency. The outputs of each phase incrementor are accumulated in respective accumulators 62a, 62b, 62c to produce accumulated values that are functions of the selected frequencies. To maintain frequency coherence among the multiple frequencies, the phase accumulation for each frequency is performed in a separate accumulator. However, phase increment registers and accumulators require only relatively minor amounts of additional hardware.

The outputs of the accumulators 62a, 62b, 62c are time division multiplexed by a multiplexer 64, which interlaces the various accumulator signals in time onto a single line. The output of multiplexer 64 is applied to a sine/cosine read only memory (ROM) 56 that stores codes which translate the values accumulated in the accumulator 62a, 62b, 62c to digitized sine and cosine outputs. The output sinusoidal waves will preferably have about 14 bit accuracy, requiring approximately $2^{16}$ entries in the ROM 56. The sampled digital sine and cosine outputs have the same frequencies as the carrier frequencies of the channels to be transmitted or tuned. The sine/cosine table look-up ROM is clocked at a higher frequency than the phase incrementors to generate multiple frequency words. For example, assuming the use of three phase incrementors that are each clocked at a 10 MHz rate, the sample rate at which the sine/cosine ROM 34 is addressed will be 30 MHz. However, the cost of the ROM is directly related to its number of gates and bits, and these need not be increased to increase its sample rate.

The output of the sine/cosine ROM 66 is applied to the complex multiplier 10 (FIGS. 1 and 2), where it is mixed with the digitized time multiplexed transmission signals from DSP 2 and received signals from ADC 18. Complex mixing is utilized because this allows the entire spectrum to be shifted in one direction, as distinguished from "real" mixing (i.e., where only one multiplication is utilized), which can result in distortion that produces overlapping images. As is well known, real mixing produces four images of the original positive and negative spectral images.

The sine and cosine outputs from ROM 66 are applied to respective complex multipliers 68 and 70 of the overall multiplier 10, which receive their input signals from terminal 72; the signal at terminal 72 can be either real or complex. The outputs from multipliers 68 and 70 are combined by adder 74 in a standard digital quadrature combiner configuration. One of the inputs to adder 74 is added, and the other is subtracted. This results in the elimination of a complex signal with real and imaginary components that is normally output from a complex mixer (the sum and difference of the mixed signals), with the final output signal being a real signal that depends upon which signal is added and which is subtracted in adder 74.

Figure 9:
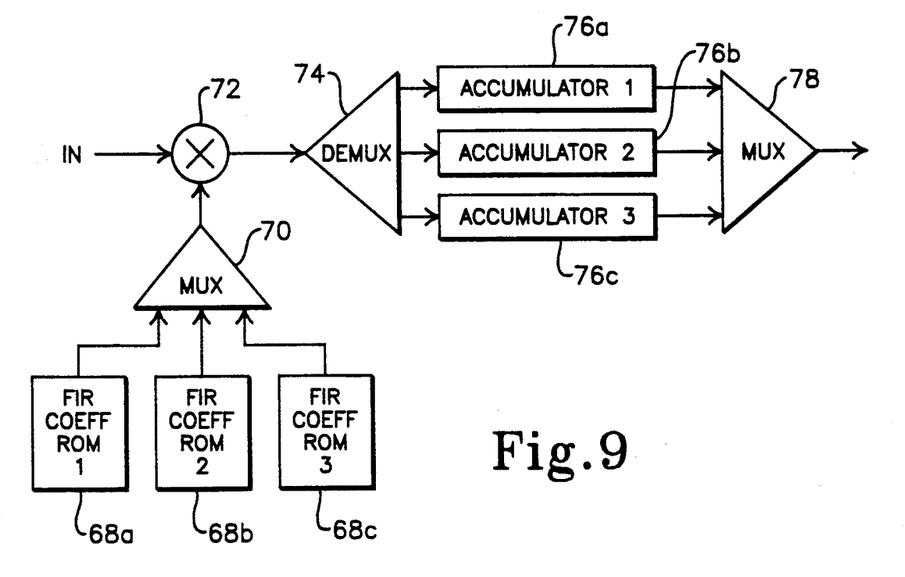

A digital FIR filter suitable for use with the present invention is illustrated in FIG. 9. Separate FIR ROMs 76a, 76b, 76c store FIR coefficients for each separate channel. The FIR ROMs are addressed in a time division multiplexed fashion, in synchronism with the multiplexing of the signal applied to the ROM by a multiplexer 78. The digital signals apply to the FIR filter are multiplied in a complex multiplier 72 by the FIR ROM coefficients for their respective channels. The results of this multiplication are separated into separate data streams by demultiplexer 82, and forwarded to respective accumulators 84a, 84b, 84c for each selected channel. Each successive input datum to complex multiplier 80 is multiplied by a successive coefficient for the corresponding channel, with the accumulator 84a, 84b, 84c for each selected channel adding the results of the multiplication for its respective input signal. The data rate output from the accumulators is thus decimated by a factor equal to the number of FIR coefficients with respect to the sample rate of its input signal. The outputs from the accumulators are then time division multiplexed back to a composite signal by multiplexer 86.

Figure 10:
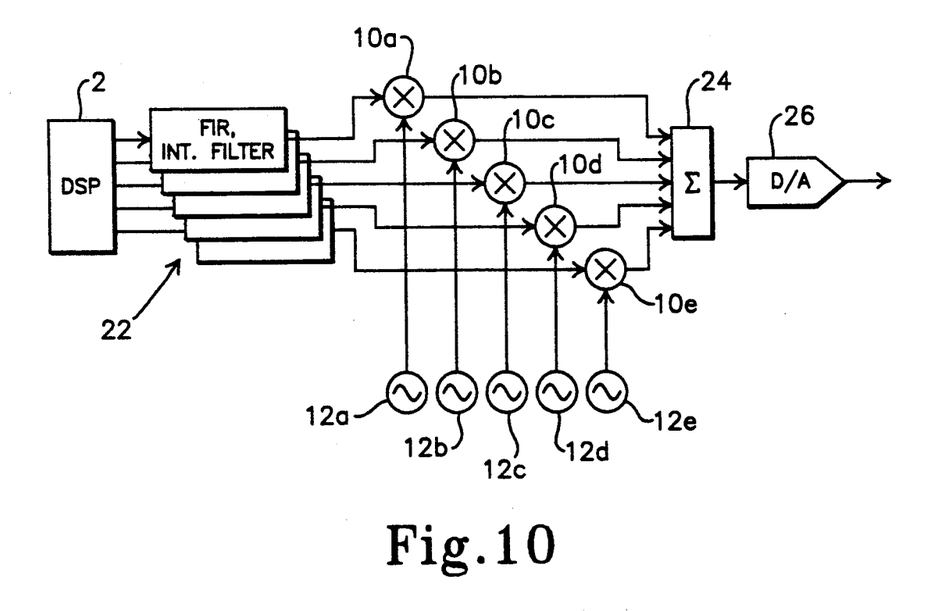
FIG. 10 is a block diagram of an alternate embodiment in which separate FIR and interpolation filters are used for each different baseband information signal to be transmitted.

Time division multiplexing is the preferred implementation for the invention, since it reduces the amount of necessary digital hardware. However, time multiplexing is not absolutely essential, and redundant digital hardware could be used for the different channels being processed. Since redundancy in the digital hardware is considerably less expensive than redundancy in the DAC or analog power amplifier, most of the cost advantages of a single DAC will still be preserved. An example of such a circuit is illustrated in FIG. 10. Five separate FIR filters 22 are provided, each receiving a respective input signal from DSP 2. Five separate complex mixers 10a, 10b, 10c, 10d and 10e mix the outputs of respective FIR filters 22 and of five separate respective direct digital synthesizers 12a, 12b, 12c, 12d and 12e. The separately processed digital transmission signals are combined in the adder 24 to again produce a single composite signal for DAC 26. Separate digital processing hardware would similarly be provided for received RF signals.

While a number of different embodiments of the invention have been shown and described, numerous variations and alternate embodiments will occur to those skilled in the art. Accordingly, it is intended that the invention be limited only in terms of the appended claims.

I claim:

1. A multiple use radio frequency (RF) transmitter, comprising:
   means for generating a plurality of different digital information signals.
   separating said digital information signals by time multiplexing,
   means for generating respective digital carrier signals for said information signals, said carrier signals having higher frequencies than their respective information signals,
   means for modulating said digital carrier signals with their respective digital information signals,
   means for accumulating said modulated signals to a composite digital signal,
   digital-to-analog converter (DAC) means common to each of said modulated signals for converting said composite digital signal to composite signal in analog format,
   means for altering the frequency of said composite signal to a desired radio frequency (RF) band, and
   means for excluding frequencies outside said desired RF band from said composite signal.

2. The multiple use RF transmitter of claim 1, said digital information and digital carrier signal generating means generating their respective signals on a time multiplexed basis, said modulating means operating on a time multiplexed basis to produce a plurality of time multiplexed modulated signals, and said accumulating means accumulating said time multiplexed modulated signals to a simultaneous time basis.

3. The multiple use RF transmitter of claim 2, wherein said frequency altering means comprises an analog frequency upconverter that is connected to operate upon the output and said DAC.

4. The multiple use RF transmitter of claim 2, said digital information signal generating means comprising a digital signal processor for generating baseband digital information signals, finite impulse response (FIR) filter means for generating higher frequency images of said baseband signals, and means for selecting a desired image signal for each information signal for modulating a respective carrier signal.

5. The multiple use RF transmitter of claim 4 said FIR filter means comprising a single FIR filter that is common to each of said digital information signals, said FIR filter operating at the data rate of said baseband digital information signals multiplied by the number of said signals.

6. The multiple use RF transmitter of claim 4, said means for selecting a desired one of said images comprising an interpolating filter.

7. The multiple use RF transmitter of claim 1, said means for altering the frequency of said composite signal comprising means for increasing the sampling rate of said signal and thereby producing higher frequency images of said signal.

8. The multiple use RF transmitter of claim 7, said means for altering the frequency of said composite signal comprising a finite impulse response (FIR) filter.

9. The multiple use RF transmitter of claim 7, said means for increasing the sampling rate of said composite signal assigning a zero value to the added samples.

10. The multiple RF transmitter of claim 7, said means for excluding frequencies outside of said desired RF band from said composite signal comprising an analog bandpass filter tuned to said desired RF band.

11. A multiple use radio frequency (RF) transmitter, comprising:
- means for generating a plurality of different digital information signals comprising a digital signal processor for generating baseband digital information signals, means for generating higher frequency images of said baseband signals, and means for selecting a desired image signal for each information signal for modulating a respective carrier signal.
- means for generating respective digital carrier signals for said information signals, said carrier signals having higher frequencies than their respective information signals,
- means for modulating said digital carrier signals with their respective digital information signals.
- means for accumulating said modulated signals to a composite digital signal,
- digital-to-analog converter (DAC) means common to each of said modulated signals for converting said composite digital signal to a composite signal in analog format,
- means for altering the frequency of said composite signal to a desired radio frequency (RF) band, and
- means for excluding frequencies outside said desired RF band from said composite signal.

12. The multiple use RF transmitter of claim 11, said means for generating higher frequency images of said baseband signals comprising means for increasing the sampling rates of said baseband signals.

13. The multiple use RF transmitter of claim 12, said means for increasing the sampling rates of said baseband signals assigning a zero value to the added samples.

14. The multiple use RF transmitter of claim 12, said means for generating higher frequency images of said baseband signals comprising finite impulse response (FIR) filter means.

15. A multiple use radio frequency (RF) transmitter, comprising:
- means for generating a plurality of different digital information signals,
- means for generating respective digital carrier signals for said information signals, said carrier signals having higher frequencies than their respective information signals,
- means for modulating said digital carrier signals with their respective digital information signals.
- means for accumulating said modulated signals to a composite digital signal,
- digital-to-analog converter (DAC) means common to each of said modulated signals for converting said composite digital signal to composite signal in analog format.
- a finite impulse response (FIR) filter for altering the frequency of said composite signal and means for increasing the sampling rate of said signal and thereby producing higher frequency images of said signal, and
- means for excluding frequencies outside said desired RF band from said composite signal.

16. The multiple use RF transmitter of claim 15, said means for generating higher frequency images of said baseband signals further comprising an x/sinx predistortion filter for compensating sinx/x distortion in the FIR filter means.

17. A multiple use radio frequency (RF) transmitter, comprising:
- means for generating a plurality of time multiplexed digital information signals,
- means for generating digital carrier signals for said information signals on a time multiplexed basis in synchronism with the multiplexing of said digital information signals,
- means for digitally modulating said digital carrier signals with respective digital information signals,
- digital-to-analog converter means common to each of said modulated signals for converting said modulated carrier signals to analog format, and
- means for altering the frequency of said modulated signals to a desired RF band.

18. A multiple use radio frequency (RF) transmitter, comprising:
- means for generating a plurality of time multiplexed digital information signals,
- means for generating digital carrier signals for said information signals,
- means for digitally modulating said digital carrier signals with their respective digital information signals,
- digital-to-analog converter means common to each of said modulated signals for converting said modulated carrier signals to analog format, and
- FIR filter means for increasing the sampling rate of said modulated signals and thereby producing higher frequency images of said signals.

19. A multiple use radio frequency (RF) transceiver comprising:
- means for generating a plurality of different digital information signals,
- means for digitizing received analog RF signals,
- means for generating digital carrier signals for said information signals and digital tuner signals for said digitized RF signals,
- digital modulator means for digitally modulating said digital carrier signals with respective digital information signals and for extracting desired frequencies from said digitized RF signals with said tuner signals,
- means for providing reception outputs from said extracted frequencies of said digitized RF signals,
- digital-to-analog converter (DAC) means common to each of said modulated digital signals for converting said signals to analog format, and
- means for altering the frequency of said modulated signals to a desired RF band.

20. The multiple use RF transceiver of claim 19, further comprising digital means for time multiplexing said digital information signals together with said digitized received RF signals for presentation of said digital modulator means as a composite signal, and time demultiplexing means for separating said modulated digital carrier signals from the extracted frequencies of said digitized RF signals.

21. The multiple use RF transmitter of claim 20, said means for providing reception outputs including digital finite impulse response (FIR) filter means and digital interpolation filter means functioning to reduce the sampling rate for said extracted frequencies, and further functioning as frequency multipliers for said digital information signals.

22. The multiple use RF transmitter of claim 21, said time multiplexing means comprising first multiplexing means for time multiplexing said digital information signals together and second multiplexing means for time multiplexing the multiplexed digital information signals together with said digitized received rF signals.

23. The multiple use RF transmitter of claim 22, said time demultiplexing means comprising first demultiplexing means for separating said modulated digital carrier signals from the extracted frequencies of said digitized RF signals, and second demultiplexing means for separating the extracted frequencies of said digitized RF signals.

24. The multiple use RF transmitter of claim 20, including a digital signal processor (DSP) for generating said digital information signals, said DSP controlling the assignment of said time multiplexing and demultiplexing means to said digital information signals and said digitized received RF signals.

* * * * *